Oct. 31, 1961

L. M. JAMES 3,006,465

ARTICLE SEGREGATION

Filed Jan. 26, 1959

LOUIS M. JAMES
INVENTOR

HUEBNER & WORREL
ATTORNEYS

BY

Oct. 31, 1961 L. M. JAMES 3,006,465
ARTICLE SEGREGATION
Filed Jan. 26, 1959 2 Sheets-Sheet 2

LOUIS M. JAMES
INVENTOR
HUEBNER & WORREL
ATTORNEYS
BY
Richard M. Worrel

United States Patent Office 3,006,465
Patented Oct. 31, 1961

3,006,465
ARTICLE SEGREGATION
Louis M. James, 2781 N. Grantland, Fresno, Calif.
Filed Jan. 26, 1959, Ser. No. 788,999
10 Claims. (Cl. 209—45)

The present invention relates to article segregation and more particularly to the segregation of dried fruit according to the degrees of stickiness thereof whereby moldy fruit can be separated from fruit which is non-moldy.

The present application is a continuation-in-part of my abandoned prior copending applications, Serial No. 779,362, filed December 10, 1958 and Serial No. 782,463, filed December 25, 1958, both of which are likewise entitled, Article Segregation.

Climates which are conductive to the production of raisins are normally hot and dry to permit sun-drying of the raisins. However, early rains sometimes do occur during the drying season, subjecting the exposed raisins to moisture, and thereby frequently causing partial molds to develop on the raisins. Inasmuch as marketing regulations permit only a very small percentage of mold in the raisins sent to market, efforts have been made in the past to remove most of the mold from the raisins.

Conventional methods and apparatus for reducing the mold in raisins have generally been too expensive and are not sufficiently effective to remove sufficient quantities of the mold to render the final product acceptable under marketing regulations. It is usually the practice for growers to transport their raisins to packers who process the raisins to remove the mold and to recover the good raisins for market. Because conventional devices remove only limited amounts of mold, packers have generally refused even to accept raisins for processing if they contain initially over about fifteen percent mold. Accordingly, many growers who are unable to remove the mold themselves are forced to sell their raisins for cattle feed, brandy stock, or other purposes at a considerable loss. Parenthetically, it is noted that the price for feed raisins is sometimes as much as one-tenth the price for good marketable raisins. When it is considered that in especially bad seasons, there are thousands of tons of raisins containing mold, the significance of the described problem is readily appreciated.

The subject invention takes advantage of the fact that the moldier raisins are, the stickier they are. Stickiness may also result from punctures in the outer skin of a raisin causing bleeding or so-called "sugaring." Since good marketable raisins are solid, firm, imperforate, and of minimum stickiness, it is also desirable to remove those raisins which are punctured or which have their skins removed or chafed and those which are regarded as too sticky. In attempting to remove mold, some known processes have damaged otherwise good raisins by abrading or piercing their skins.

In my prior applications, apparatus is disclosed for separating raisins on the basis of their stickiness or surface adhesiveness. In general, such apparatus provides a pair of peripherally engaging drums, one of which is adherent and attracts only moldy or sticky raisins while the other drum is non-adherent insofar as both the moldy and non-moldy raisins are concerned. The non-adherent drum is employed for pressing all of the raisins against the adherent drum causing the moldy raisins to adhere to such drum and thereby to be removed from the general flow of raisins passing between the drums. In this manner, segregation is effected.

However, in striving to remove all or nearly all of the moldy raisins from any given quantity of raisins, another problem arose. It is a characteristic of some moldy raisins that the mold exists only on certain areas of the surfaces of the raisins. These may be regarded as partially moldy in contrast to raisins which are wholly moldy over the entire surfaces thereof. Accordingly, if the partially moldy raisins happen to pass between the drums so that their moldy areas are not facing the adherent drum, it will be evident that these raisins, although moldy, will not stick to the adherent drum. Such raisins pass along with the non-moldy raisins and the segregation is not as complete and as satisfactory as desired. It is in regard to the solution of this problem and to the complete separation of practically all of the moldy raisins from the non-moldy raisins that the developments of the present invention were made.

Accordingly, it is an object of the present invention to segregate articles, and particularly dried fruit such as raisins, according to their degrees of stickiness.

Another object is to segregate such fruit in a more thorough and complete manner.

Another object is to separate moldy dried fruit from non-moldy dried fruit notwithstanding the existence of mold only on certain areas of the surfaces of such moldy fruit.

Another object, in a dried fruit segregating machine in which the fruit are passed between a pair of drums, is to segregate moldy from non-moldy fruit notwithstanding the positions or orientation of the fruit as it passes between the drums.

Another object, in a machine of the type described in the preceding paragraph wherein one of the drums attracts moldy fruit by adhesion of their sticky surfaces to the drum, is also to remove the moldy fruit which has its sticky surfaces facing away from the drum during passage thereby.

Other objects are to enable the marketing of a large quantity of otherwise unmarketable raisins by removing those which are moldy from such quantity, to minimize financial loss to the growers of such raisins, to provide an economical raisin separating apparatus, to perform such segregation without harm to the raisins, and to provide an apparatus which can be employed for segregating various dried fruits other than raisins.

These, together with other objects, will become more fully apparent upon reference to the following description and accompanying drawing.

Figure 1:
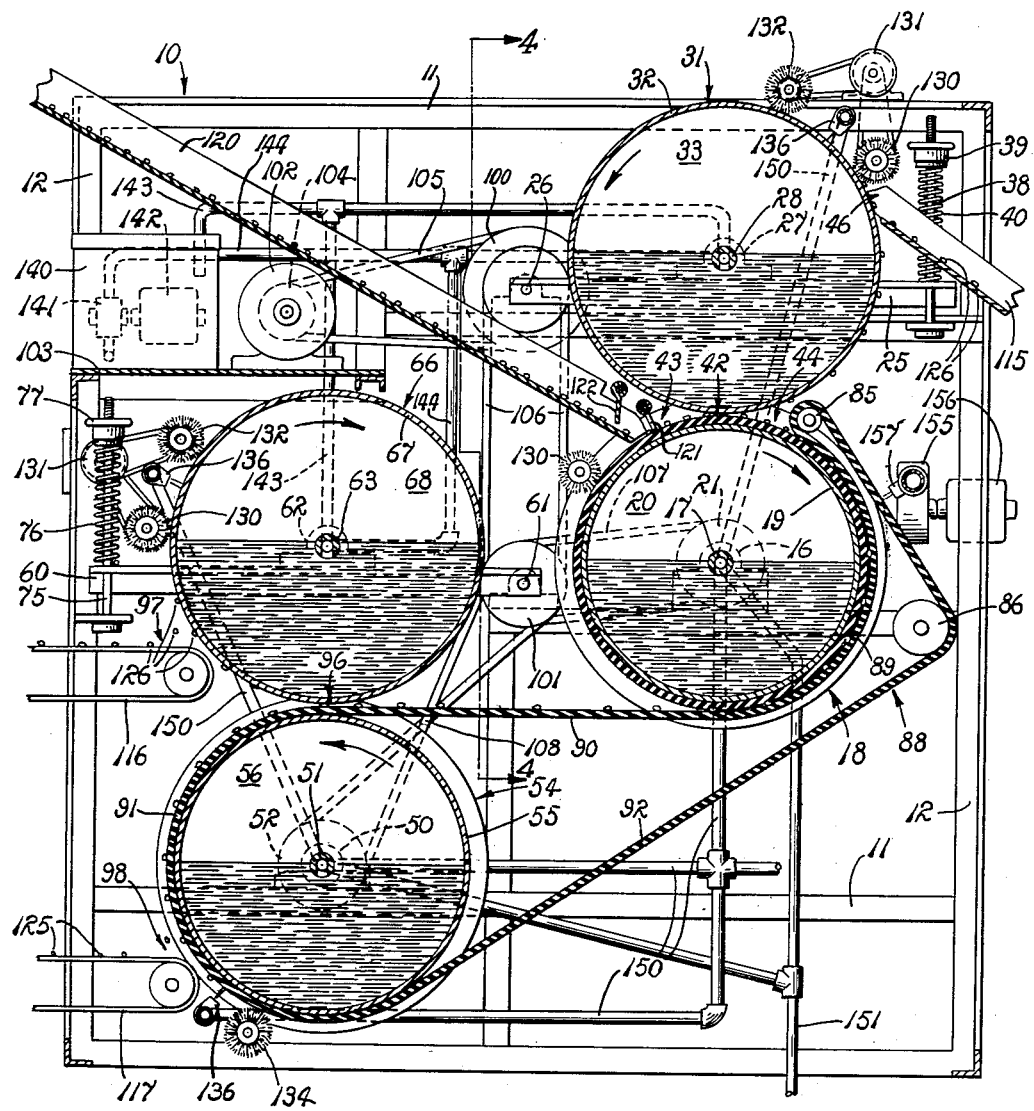
FIG. 1 is a vertical section taken through a segregating machine embodying the principles of the present invention.

Referring more particularly to the drawing, an upright frame is indicated by the numeral 10 and includes a plurality of interconnected horizontal beams 11 and vertical posts 12. The frame illustrated is typical of various constructions which may be employed for supporting the elements of the present apparatus. No detailed description of the frame is given inasmuch as the invention is not limited to the specific type of frame illustrated and those skilled in the art can vary the frame construction without departing from the principles of the present invention.

Bearings 16 are mounted in the frame 10 on horizontal beams 11 and rotatably journal an elongated horizontal shaft 17. A cylindrical lower primary presser drum 18 is concentrically secured to the shaft between the bearings and includes an annular side wall 19 having a resiliently flexible and compressible surface, of sponge rubber for example, and a pair of opposite end walls 20 connected to the side wall and extended radially outwardly from the side wall. The walls thus enclose a substantially fluid-tight chamber within the drum. The shaft has concentric bores 17a at opposite ends thereof and these bores open into the chamber through inlet and outlet apertures, 17b inwardly, adjacent to opposite ends of the shaft. A driven pulley 21 is secured to the lower shaft.

A pair of elongated, transversely spaced arms 25 are elevationally adjustably mounted in the frame 10 on coaxial pins 26 above the lower primary drum 18. Bearings 27 are longitudinally adjustably mounted on the arms, and an elongated upper shaft 28 is journaled in the upper bearings. An upper cylindrical primary carrier drum 31 is secured to the upper shaft between the bearings 27 and includes an annular side wall 32 of heat conductive material, such as stainless steel, and a pair of opposite end walls 33 connected to the side wall so as to provide a fluid-tight chamber within the upper drum. The shaft 28 also has bores 29 at opposite ends thereof and provides inlet and outlet apertures 30, opening into the chamber of the upper drum and inwardly adjacent to the opposite ends of the shaft.

Elongated upstanding rods 38 have lower ends mounted in the frame 10 and are individually upwardly slidably extended through the arms 25. Nuts 39 are screw-threaded on the upper ends of the rods above the arms, and compression springs 40 are coiled about the rods and bear against the nuts and arms. It is to be understood that the upper and lower shafts 28 and 17 are vertically spaced from each other in a substantially common vertical plane and that the drums 31 and 18 are in peripheral contact at a primary raisin receiving station 42 between the shafts. By threading the nuts downwardly on the rods, the compression between the drums is increased, and vice versa. Since the upper drum is in frictional driven engagement with the lower drum, when the lower drum is rotated in a clockwise direction, as viewed in FIG. 1, then the primary receiving station has an inlet side indicated at 43 and an outlet side indicated at 44. Also, for purposes of reference, it is to be noted that a primary moldy raisin releasing station 46 is provided adjacent to the upper drum 31 in upwardly circumferentially spaced relation along the side wall 32 from the raisin receiving station.

Bearings 50 are mounted in the frame 10 to the left of and below the lower primary drum 18, as viewed in FIG. 1. An elongated shaft 51 is journaled in these bearings, and a driven pulley 52 is secured to one end of this shaft. A lower cylindrical secondary presser drum 54 is secured to the lower shaft 51 between the bearings and includes an annular side wall 55, preferably of stainless steel, and spaced end walls 56 connected to the side wall but radially outwardly extended therefrom.

Transversely spaced elongated arms 60 are mounted for elevational pivotal movement on coaxial pins 61 located below and in a substantial common vertical plane with the upper pins 26 and so that the arms are above the lower secondary drum 54. Bearings 62 are longitudinally adjustably mounted on the arms, and an elongated upper shaft 63 is journaled in the bearings in vertically spaced relation to and in a substantially common vertical plane with the lower shaft 51. An upper cylindrical secondary carrier drum 66 is secured to the upper shaft 63 between its bearings, and as with the primary upper drum 31, has an annular side wall 67 of heat conductive material, such as stainless steel, and opposite end walls 68. Both of the upper and lower shafts 63 and 51 are endwardly bored and these bores communicate through inlet and outlet apertures, not shown, with the chamber provided by the upper and lower drums 66 and 54, similar to the shafts 17 and 28.

Also, in connection with the secondary carrier drum 66, elongated rods 75 are provided having lower ends mounted in the frame 10 and upper ends individually upwardly slidably extended through the arms 60. Springs 76 individually circumscribe the upper ends of the rods above the arms, and nuts 77 are screw-threadably turned on the rods and bear against the springs for varying the compression thereof.

Upper and lower belt rollers 85 and 86 are journaled for rotation on horizontal axes in the frame 10, one of such rollers being located adjacent to the outlet side 44 of the primary raisin receiving station 42, and the other of such rollers being located therebelow and to the right of the lower primary drum 18, all as seen in FIG. 1. The upper roller is adjustable toward and away from the raisin receiving station. An elongated endless conveyer belt 88 having a backing portion of flexible, non-elastic material, such as a suitable high strength rubber and a facing portion of resiliently flexible and compressible material, such as sponge rubber, is trained about the belt rollers and has an arcuate primary run 89 extended along a portion of the circumference of the lower primary drum 18, a horizontal transferring run 90 extended, from a position tangential to the lower primary drum and substantially diametrically opposite to the primary raisin receiving station, toward the secondary drums 54 and 66 and between these drums, a secondary arcuate run 91 extended slightly more than half way around the lower secondary drum 54, and a return run 92 extended around the lower roller 86 back to the upper roller. "Slipicone," a heat-stable, non-toxic silicone release agent and a product of the Dow Corning Corporation of Midland, Michigan, may be applied to the belt and to the lower primary drum to minimize raisin adherence thereto. The belt is in frictional driven engagement with the lower secondary drums and, although not shown, may be provided with a suitable belt tightening device so as additionally to hold the belt in tensioned engagement with these drums and the rollers. By adjusting the position of the roller 85, the frictional engagement between the belt and the lower primary drum can also be adjusted.

The secondary drums 54 and 66 compressively sandwich the belt 88 therebetween and define at this position of contact a secondary raisin receiving station 96. Also for purposes of later reference, a secondary moldy raisin releasing station 97 is identified adjacent to the upper secondary drum 66 in circumferentially spaced relation therearound from the secondary raisin receiving station. A non-moldy raisin releasing station 98 is identified adjacent to the lower secondary drum 54 and is in circumferentially spaced relation therearound from the secondary receiving station. By varying the compression on the springs 76 by means of the nuts 77, the compression between the secondary drums and on the belt can be varied.

A series of upper and lower pulleys 100 and 101 are rotatably mounted in the frame coaxially of the upper and lower pivot pins 26 and 61, respectively. A main drive motor 102 is mounted on a platform 103 in the frame 10 and has an output pulley 104. Pulley belts 105, 106, 107, and 108, are respectively trained about the output pulley and a first of the upper pulleys 100, about a second upper pulley and a first of the lower pulleys 101, about a second lower pulley and the driven pulley 21, and about the third lower pulley and the driven pulley 52; the latter belt is twisted so that the driven pulley 52 rotates in the opposite direction from the pulleys 101. Other driving mechanisms and arrangements may obviously be employed. Upon energization of the motor, the described pulley and belt mechanism rotates the lower primary drum 18 in a clockwise direction, and the lower secondary drum 54 in a counterclockwise direction, all as viewed in FIG. 1. The upper primary drum 31 is frictionally driven in a counterclockwise direction by the lower primary drum, as previously explained, and the conveyer belt 88 is motivated in a counterclockwise direction by reason of its frictional engagement with the lower drums. Although pulleys and pulley belts have been satisfactory in practice for effecting drive, sprockets and chains may obviously be employed if more precise synchronization is required.

It is further to be observed that the conveyer belt 88 is of substantially the same width as the length of the lower drums 18 and 54 and is held in desired transverse position by the radial extensions on the end walls 20 and 56 of the lower drums. Although the primary run 89 of the belt is tensioned against the lower primary drum 18, it is to be understood that the belt is sufficiently resiliently flexible to permit yieldable movement of the belt away from the lower primary drum incident to passage of articles between the lower drum and the belt, as will be described hereinafter.

A primary moldy raisin conveyer 115 is mounted in the frame 10 adjacent to the primary moldy raisin releasing station 46, a secondary moldy raisin conveyer 116 is mounted in the frame adjacent to the secondary raisin releasing station 97, and a non-moldy raisin conveyer 117 is mounted in the frame adjacent to the non-moldy raisin releasing station 98. An elongated downwardly declined delivery chute 120 is mounted in the frame and provides a lower end adjacent to the primary raisin receiving station 42 at the inlet side 43 thereof. Brackets 119 suspended from the horizontal frame members 11, on opposite sides of the frame, support an elongated vibrating comb 121 and an inlet plate 122 above the lower end of the delivery chute. The delivery chute is adapted to feed good non-moldy raisins 125 and moldy raisins 126 in random, non-segregated manner into the primary raisin receiving station. The comb includes an elongated shank 121a axially reciprocally mounted in the brackets in parallel relation to the shaft 17 and a plurality of teeth 121b rigidly radially outwardly extended from the shank in longitudinally spaced relation therealong and directed toward the primary drum 18 in substantially radial relation thereto. A cam following disc 121' is secured to the shank adjacent to an end thereof and endwardly of the primary drum. A coiled compression spring 121c encircles the shank between the disc and the adjacent bracket for yieldably urging the disc into engagement with an annular sinusoidal camming ring 129 secured to the end of the primary drum concentrically of the shaft 17. The camming ring has a plurality of substantially equally spaced camming peaks 129a and camming valleys 129b. The shank is thus longitudinally reciprocated incident to rotation of the primary drum as the disc rides over the camming ring. The comb functions to distribute the raisins in a layer along the entire length of the lower primary drum 18, and the inlet plate meters the thickness of this layer of raisins.

Relatively hard, raisin removing brushes 130 are mounted for rotation in the frame 10 adjacent to the primary and secondary upper drums 31 and 66 and above the conveyers 115 and 116 at the raisin releasing stations 46 and 97. These brushes are rotatably driven by means of motors 131 mounted in the frame and are in brushing engagement with the side walls 32 and 67 of the upper drums. A brush 130 is also rotatably mounted in engagement with the lower primary drum 18 adjacent to the inlet side 43 of the primary receiving station 42. This brush is rotated like the other brushes but, for illustrative clarity, the means for rotating it has been omitted. Also, relatively soft drum cleaning brushes 132 are similarly mounted in the frame for rotatable engagement with the side walls of the upper drums and follow the removing brushes relative to the direction of rotation of their respectively adjacent drums. These cleaning brushes are also driven by the motors 131. A belt cleaning brush 134 is rotatably mounted in the frame for brushing engagement against the belt 88 below the non-moldy raisin conveyer 117 and against the arcuate secondary run 91 of the belt and is driven like brushes 130 and 132 although not so specifically shown. Spray nozzles 136 are mounted in the frame and directed respectively toward the upper drums adjacent to their respectively associated cleaning brushes 132 and toward the belt adjacent to its associated brush 134.

A hot water system is provided with the present invention and includes a tank 140 mounted in the frame 10, a pump 141 connected to the tank and driven by a motor 142, an inlet conduit 143 connected from the outlet of the pump to the bored ends of each of the shafts 28 and 63, and an outlet conduit 144 connected from the opposite ends of each of these shafts back to the tank. The inlet and outlet conduits 143 and 144 are respectively connected to opposite ends of the shafts 28 and 63 by fluid couplings 145 which permit rotation of the shafts relative to the conduits while maintaining dependable fluid-tight connections. Upon energization of the pump, hot water in the tank is continuously circulated from the tank through the chambers of the upper drums 31 and 66, and back into the tank. As indicated, each of these upper drums is continuously maintained substantially half full of hot water by the described hot water system.

A cold water system includes a plurality of conduits 150 connected to a source of cold water under pressure, not shown, and also to one of the bored ends of each of the lower shafts 17 and 51, and drain conduits 151 connected to the opposite ends of each of these shafts and leading to a suitable drain gutter, not shown. The conduits 150 and 151 are respectively connected to the shafts 17 and 51 by fluid couplings 152 which permit rotation of the shafts relative to the conduits while maintaining fluid-tight connections therebetween. Conduits 150 are also connected from the source of cold water to the nozzles 136. Accordingly, a continuous circulation of cold water is provided through the lower drums 18 and 54 so that these drums are always maintained half full of cold water. Also, a spray of cold water is directed onto the upper primary drum 31 and onto the belt 88 primarily for cleaning purposes.

A blower 155 and an associated motor 156 are mounted in the frame, and a nozzle 157, connected to the blower, is directed toward the return run 92 of the belt 88 relatively adjacent to the primary raisin receiving station 42 for blowing cool air onto the belt and maintaining the same at a relatively cool temperature.

*Operation*

The operation of the described embodiment of the subject invention is briefly summarized at this point. Before referring specifically to the operation, however, attention is first directed to FIGS. 2 and 3. As previously explained, certain moldy raisins 126 have mold 127 and 128 only on certain limited areas of the surfaces of such raisins. There are, of course, some moldy raisins which are completely moldy over their entire surfaces. These characteristics are specifically noted inasmuch as it is to be remembered that the moldy areas of the resins are the areas which exhibit the greatest surface stickiness, advantage of which is taken by the apparatus of the subject invention. Further, it is to be noted that the raisins 125 and 126 fed to the primary drums 18 and 31 by the chute 120 are randomly oriented so that such moldy areas 127 and 128 may be directed upwardly, downwardly, or in other directions. Because of the size of the raisins and the extent of mold thereon, there is great likelihood, with most of the moldy raisins, that some moldy areas will be directed either upwardly or downwardly.

Figure 2:
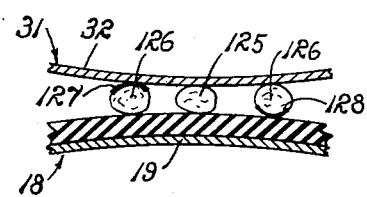
FIG. 2 is a somewhat enlarged fragmentary vertical section taken through a portion of the machine of FIG. 1 and showing passage of raisins through the machine.
Figure 3:
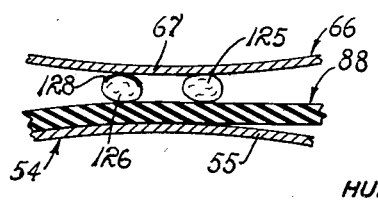
FIG. 3 is a view similar to FIG. 2 but showing the raisins at a different stage of passage through the machine.
Figure 4:
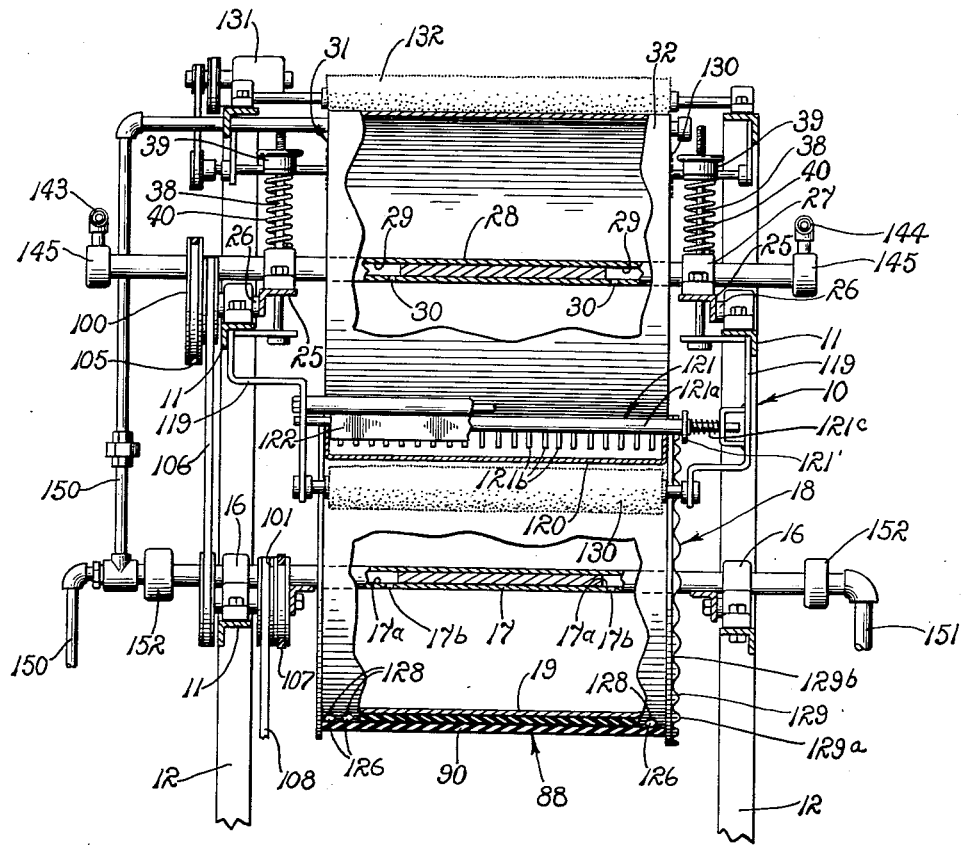
FIG. 4 is a fragmentary, vertical cross-section taken on a plane at a position represented by line 4—4 in FIG. 1 but showing parts broken away for further illustration of the structure involved.

The apparatus is started by energizing the motors 102 and 131 so as to rotate the drums 18, 31, 54, 66, to motivate the belt 88, and to rotate the brushes 130, 132, and 134. Cold water is supplied to the conduits 150 and the pump 141 is activated so as to circulate hot water through the upper drums. Further, the blower 155 is actuated to blow cold air onto the belt. Assuming proper spring compression on the springs 40 and 76, raisins 125 and 126 are dumped onto the delivery chute 120 and fed to the raisin receiving station 42. When the raisins are excessively sticky and clustered together, it is desirable to subject them to a preliminary rinse in water before dumping them on the chute. In many instances it may be adequate to apply a fine spray or "fog" of water to the raisins prior to passage into the primary receiving station. With reference to FIG. 2, it will be noted that some of the moldy raisins 126 have their moldy areas 127 facing the upper primary drum 31 while other moldy raisins have their moldy areas 128 facing the lower primary drum 18. Because of the stickiness of the moldy areas and the temperature of the upper drum 31, the raisins having mold contacting the upper drum adhere to the hot side wall 32 and are carried therewith upwardly as the upper drum rotates. These raisins are brushed from the upper drum at the moldy raisin releasing station 46 onto the conveyer 115.

The non-moldy good raisins 125 and those moldy raisins 126 having their moldy areas 128 against the lower primary drum 18 do not adhere to the upper drum but move along with the lower drum between the belt 88 and the lower drum 18. The raisins remaining on the lower drum are held thereagainst by the belt in substantially the same positions of orientation that they assumed as they passed through the raisin receiving station 42. When these latter raisins move out of engagement with the lower drum and along the horizontal run 90 of the belt 88, they are inverted in position with respect to their positions as they passed through the raisin receiving station 42. In this condition these raisins are passed between the secondary drums 54 and 66 through the secondary raisin receiving station 96. Because of the inversion, the moldy areas 128 of the moldy raisins 126 face upwardly and are in contact with the hot side wall 67 of the upper secondary drum. This upper drum thus attracts the moldy raisins and carries them upwardly to the moldy raisin releasing station 97 where they are brushed from the upper drum onto the secondary moldy raisin conveyer 116.

The good raisins 125 do not adhere to the upper secondary drum 66 but pass along with the lower secondary drum 54, as it rotates downwardly toward the non-moldy raisin releasing station 98, and fall onto the non-moldy raisin conveyer 117. The cleaning brushes 132 and 134 clean their respective upper drums and belt of any raisin fragments which tend to cling thereto. The sprays of water from the nozzles 136 help to loosen such raisin fragments.

By maintaining the lower drums 18 and 54 and the belt 88 cool, the lower drums and the belt are relatively non-adherent at least with respect to the degrees of adherency of the upper drums 31 and 66. It will be evident from the foregoing that the degree of segregation depends to some extent on the range of stickiness of the raisins fed to the drum 18. Where the difference in stickiness between the good and moldy raisins is not great, several adjustments may be made in the apparatus. In order more completely to bring out the sticky characteristics of the raisins, it may be necessary to increase the temperature of the carrier drums 31 and 36, to decrease the temperature of the presser drums 18 and 54 and belt 88, to increase the pressure of engagement of the carrier drums with the lower presser drums 18 and 54, or to increase the length of time the raisins are pressed between the carrier drums and the presser drum 18 and belt. The temperature of the drums and belt can, of course, be increased or decreased by increasing or decreasing the temperature of the water circulated through the respective drums. The pressure of the upper drums against the lower drums and belt is increased by increasing the compression of the springs 38 and 76. The time during which the raisins are pressed against the lower wall is increased by decreasing the speed of rotation of the drums.

From the foregoing it will be evident that an apparatus has been provided for segregating dried fruit which is moldy, such as raisins, and other articles, according to their degrees of stickiness. Because dried fruit frequently is moldy only on certain limited areas of the surfaces of such fruit, the subject machine provides for the reorientation of such fruit as it passes through the machine thereby to present opposite surfaces of certain moldy raisins to the hot raisin carrier or pickup drums. In this manner, very thorough and complete removal of practically all the moldy raisins passing through the machine is effected.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. An apparatus for segregating moldy and non-moldy dried fruit, some of such moldy fruit having mold only on certain areas of the surface of such fruit, comprising a frame; primary and secondary pairs of laterally spaced upper and lower substantially cylindrical hollow drums rotatably mounted in the frame about substantially horizontal axes with the axes of each pair of drums being in substantially parallel relation; means interconnecting the frame and one of the drums of each pair of drums for yieldably urging said interconnected drum of the pair toward each other drum of such pair; means mounted in the frame for heating the upper drum of each pair of drums and for cooling the lower drum of each pair of drums; drive means mounted in the frame and connected to the lower drum of each pair for imparting rotation to both of the lower drums, the upper primary drum being in frictionally driven engagement with the primary lower drum; an elongated endless belt; means mounting the belt in the frame so that it extends from a position engaging said lower primary drum after contact thereby with the upper primary drum, thence along a portion of the circumference of the lower primary drum, thence between the secondary drums and around the lower secondary drum, and return, said means mounting the belt for circuitous travel in frictionally driven engagement with said lower drums, the belt being compressibly engaged between the secondary drums so that said upper secondary drum is frictionally driven by the lower secondary drum and the belt; primary and secondary moldy fruit conveyers mounted in the frame respectively adjacent to the upper drums; a non-moldy fruit conveyer mounted in the frame adjacent to the portion of the belt extended around the lower secondary drum; and means mounted in the frame for feeding non-segregated moldy and non-moldy fruit between the primary drums whereby moldy fruit having their moldy surface areas facing the upper primary drum adhere thereto and are carried thereby toward the primary moldy fruit conveyer, whereby non-moldy fruit and moldy fruit having their moldy surface areas facing the lower primary drum are held with such moldy surface areas against the lower primary drum by the belt during continued rotation of the lower primary drum and are inverted and carried by the belt after disengagement from the lower primary drum between the second drums so that the moldy surface areas of the moldy fruit face toward the upper secondary drum and adhere thereto, whereby fruit adhering to the upper secondary drum are carried toward the secondary moldy fruit conveyer, and whereby non-moldy fruit remaining on the lower secondary drum are carried thereby toward the non-moldy fruit conveyer.

2. In an apparatus for separating good non-moldy raisins from moldy raisins on the basis of surface stickiness thereof, the surfaces of some of the moldy raisins having mold only on certain areas of such surfaces whereby said areas are stickier than non-moldy areas of the surfaces; a frame; a cylindrical primary carrier drum mounted in the frame for rotation about a substantially horizontal axis and having an outer raisin adherent surface movable past a lower primary raisin receiving station during such rotation; means mounted on the frame for delivering non-separated good and moldy raisins to the carrier drum at said receiving station; means contacting the primary carrier drum for heating said raisin adherent surface a cylindrical primary presser drum rotatably mounted in the frame for rotation about an axis substantially parallel to and below the carrier drum and having an outer non-raisin adherent surface engaging the surface of the carrier drum at said receiving station for pressing raisins delivered to the station against the carrier drum, the moldy raisins which are oriented so that their moldy areas contact the carrier drum adhering to the carrier drum while the good raisins and those moldy raisins having their moldy areas contacting the presser drum remaining on the outer surface of the presser drum as said presser drum surface travels away from the receiving station; means contacting the primary presser drum for cooling its outer surface; a cylindrical secondary carrier drum mounted in the frame for rotation about an axis in laterally spaced, substantially parallel relation to the axis of the primary presser drum and having an outer raisin adherent surface movable past a lower secondary raisin receiving station; means contacting the secondary carrier drum for heating the adherent surface of said secondary drum; a cylindrical secondary presser drum rotatably mounted in the frame for rotation about an axis substantially parallel to and below the secondary carrier drum and having an outer surface in closely adjacent relation to the secondary carrier drum at said secondary raisin receiving station; means contacting the secondary presser drum for cooling the outer surface of the secondary presser drum; an endless conveyer belt; means mounting the belt in the frame for circuitous travel and so that it extends from a raisin engaging station against the outer surface of the primary presser drum closely adjacent to said primary receiving station and on the opposite side thereof from the delivery means, along the outer surface of the primary presser drum to a position substantially diametrically opposite to the primary raisin receiving station, thence substantially horizontally toward and between the secondary drums through the secondary station, and thence around the secondary presser drum past a good non-moldy raisin releasing station, and return to the raisin engaging station, said mounting means tensioning the belt against the presser drum whereby raisins remaining on the outer surface of the primary presser drum after moving through the primary raisin receiving station are held against the outer surface of the primary presser drum by the belt so that the moldy areas of the moldy raisins remain in contact with the primary presser drum and so that said moldy areas are upwardly disposed on the belt as it travels horizontally through the secondary receiving station, the secondary presser drum pressing the raisins on the belt against the secondary carrier drum at the secondary receiving station whereby the moldy raisins adhere to the secondary carrier drum while the good raisins remain on the belt and travel therewith toward the non-moldy raisin releasing station; and means mounted in the frame adjacent to the primary and secondary carrier drums and adjacent to the good raisin releasing station for respectively collecting raisins released from the carrier drums and from the belt.

3. In an apparatus for separating good non-moldy-rains from moldy raisins on the basis of surface stickiness thereof, the surfaces of some of the moldy raisins having mold only on certain areas of such surfaces whereby said areas are stickier than non-moldy areas of the surfaces; a frame; a cylindrical primary carrier drum mounted in the frame for rotation about a substantially horizontal axis and having an outer raisin adherent surface movable past a lower primary raisin receiving station during such rotation; means mounted on the frame for delivering non-separated good and moldy raisins to the carrier drum at said receiving station; a cylindrical primary presser drum rotatably mounted in the frame for rotation about an axis substantially parallel to and below the carrier drum and having an outer non-raisin adherent surface engaging the surface of the carrier drum at said receiving station for pressing raisins delivered to the station against the carrier drum, the moldy raisins which are oriented so that their moldy areas contact the carrier drum adhering to the carrier drum while the good raisins and those moldy raisins having their moldy areas contacting the presser drum remaining on the outer surface of the presser drum as said presser drum surface travels away from the receiving station; a cylindrical secondary carrier drum mounted in the frame for rotation about an axis in laterally spaced, substantially parallel relation to the axis of the primary presser drum and having an outer raisin adherent surface movable past a lower secondary raisin receiving station; a cylindrical secondary presser drum rotatably mounted in the frame for rotation about an axis substantially parallel to and below the secondary carrier drum and having an outer surface in closely adjacent relation to the secondary carrier drum at said secondary raisin receiving station; means mounted in the frame and connected to the carrier drums for circulating hot water through the carrier drums for heating their raisin adherent surfaces, and means mounted in the frame and connected to the presser drums for cooling the presser drums and the belt to minimize adherence of raisins thereto relative to the carrier drums an endless conveyer belt; means mounting the belt in the frame for circuitous travel and so that it extends from a raisin engaging station against the outer surface of the primary presser drum closely adjacent to said primary receiving station and on the opposite side thereof from the delivery means, along the outer surface of the primary presser drum to a position substantially diametrically opposite to the primary raisin receiving station, thence substantially horizontally toward and between the secondary drums through the secondary station, and thence around the secondary presser drum past a good non-moldy raisin releasing station, and return to the raisin engaging station, said mounting means tensioning the belt against the presser drums whereby raisins remaining on the outer surface of the primary presser drum after moving through the primary raisin receiving station are held against the outer surface of the primary presser drum by the belt so that the moldy areas of the moldy raisins remain in contact with the primary presser drum and so that said moldy areas are upwardly disposed on the belt as it travels horizontally through the secondary receiving station, the secondary presser drum pressing the raisins on the belt against the secondary carrier drum at the secondary receiving station whereby the moldy raisins adhere to the secondary carrier drum while the good raisins remain on the belt and travel therewith toward the non-moldy raisin releasing station; and means mounted in the frame adjacent to the primary and secondary carrier drums and adjacent to the good raisin releasing station for respectively collecting raisins released from the carrier drums and from the belt.

4. In an apparatus for segregating dried fruit and other articles according to their degrees of surface stickiness, some of said articles having relatively sticky and non-sticky areas on their surfaces; a support; primary and secondary article carriers each having external surfaces; means engaging each of the carriers for heating the external surfaces thereof whereby such surfaces are adherent to sticky areas of such articles; means mounting the primary carrier in the support for movement along a first circuitous path through a primary article receiving station with its external surface downwardly disposed and thence upwardly along a first article releasing station, and return to said primary station; means mounting the secondary carrier in the support in spaced relation to the primary carrier for movement along a second circuitous path through a secondary article receiving station with the external surface of the secondary carrier downwardly disposed, thence upwardly along a second article releasing station, and return to said secondary station; conveying means mounted in the support for movement in a predetermined direction along a third path successively extended under the primary carrier at said primary station and thence under the secondary carrier at said secondary station for conveying articles passing through the primary station to the secondary station and for inverting such articles prior to passage through the secondary station; means engaging the conveying means for cooling said conveying means at said stations to minimize adherence of such articles to the conveying means relative to said external surfaces of the carriers; means individually interconnecting the support and the carriers for urging the carriers into frictional driven engagement with the conveying means at their respective stations; and powered drive means borne by the support and connected to the conveying means for imparting movement thereto in said predetermined direction along its path.

5. In an apparatus for segregating dried fruit according to degrees of surface stickiness wherein some of the fruit have peripherally spaced surface areas of different degrees of stickiness; a support; a primary conveyer mounted in the support for movement in a predetermined direction along a circuitous path through a primary fruit receiving station wherein the conveyer is substantially horizontal; a primary fruit pickup member mounted in the support for movement between a lower position engaging the primary conveyer at said primary station to pick up selected fruit from the primary conveyer and an upper position spaced upwardly from the primary conveyer; means mounted in the support for deliverying fruit to be segregated to the primary conveyer adjacent to the primary pickup member in advance of said primary station for passage of the fruit through said station; conveying means mounted in the support for movement in a circuitous path from an upper position engaging the primary conveyer adjacent to the primary pickup member following said primary station, thence downwardly along and in engagement with said primary conveyer, thence laterally outwardly in a substantially horizontal position through a secondary fruit receiving station, and return to said upper position for receiving fruit remaining on the primary conveyer after passage through the primary station, for inverting said remaining fruit during travel along said primary conveyer, and for conveying said remaining fruit in inverted position through said secondary station; a secondary fruit pickup member mounted in the support for movement between a lower position engaging the conveying means at said secondary station to pick up selected fruit from said conveying means, and an upper position spaced upwardly from the conveying means; means mounted in the support and connected to each of the fruit pickup members for heating such members to cause sticky fruit to adhere thereto; and means mounted in the support and connected to the primary conveyer and to said conveying means for cooling the primary conveyer at the primary fruit receiving station and the conveying means at the secondary station relative to the heated pickup members at said stations.

6. In an apparatus for segregating dried fruit, and similar articles; a support; a primary conveyer mounted in the support for movement in a predetermined direction along a circuitous path through a primary fruit receiving station wherein the conveyer is substantially horizontal; a primary fruit pickup member mounted in the support for movement between a lower position engaging the primary conveyer at said primary station to pick up selected fruit from the primary conveyer and an upper position spaced upwardly from the primary conveyer; means mounted in the support for delivering fruit to be segregated to the primary conveyer adjacent to the primary pickup member in advance of said primary station for passage of the fruit through said station; an elongated endless flexible belt; means borne by the support mounting the belt in the support for travel in a circuitous path from an upper position in adjacent spaced relation to said pickup member and on the opposite side of said station from said delivering means, downwardly along an upper arcuate run in overlaying engagement with the primary conveyer, thence along a substantially horizontal run laterally outwardly extended from the primary conveyer through a secondary fruit receiving station, thence along a lower arcuate run, and return to said upper position whereby fruit remaining on the primary conveyer after passage through the primary station is inverted along said upper run for travel along said horizontal run and through said secondary station in a position inverted with respect to its position during travel through the primary station; a secondary fruit pickup member mounted in the support for movement between a lower position engaging the horizontal run of the belt at said secondary station to pick up selected fruit from the belt, and an upper position spaced upwardly from the belt; means mounted in the support and connected to each of the fruit pickup members for heating such members to cause sticky articles to adhere thereto; and means mounted in the support and connected to the primary conveyer and to said belt mounting means for cooling the primary conveyer at the primary fruit receiving station and the belt at the secondary station relative to the heated pickup members at said stations.

7. In an apparatus for processing dried fruit, or like articles; a support; primary and secondary pairs of laterally spaced, upper and lower drums rotatably mounted in the support for rotation about substantially horizontal axes with the axes being in substantially parallel relation to each other, and with the axes of the drums of each pair being in a substantially common vertical plane; means mounted in the support and connected to the upper drums for supplying a heating medium thereto; means mounted in the support and connected to the lower drums for supplying a cooling medium thereto whereby sticky articles adhere to the upper drums but not to the lower drums; means interconnecting the support and one of the primary drums for yieldably urging said interconnected primary drum into peripheral contact with the other primary drum at a primary fruit receiving station; means borne by the support for feeding fruit to be processed onto the lower primary drum on one side of the primary station; an elongated, endless, flexible belt mounted in the support having an upper arcuate run engaging the lower primary drum in adjacent spaced relation to said primary station on the opposite side thereof from said feeding means and extended around the lower primary drum, an intermediate substantially horizontal run integral with the upper run and extended substantially tangentially from the lower primary drum to and between the secondary drums at a secondary fruit receiving station, a lower arcuate run integral with said intermediate run and extended around the lower secondary drum, and a return run integrally interconnecting said upper and lower runs; means mounted on the support engaging the belt and yieldably urging said upper and lower runs into frictional engagement with their respective lower drums; means interconnecting the support and one of the secondary drums for yieldably urging the interconnected secondary drum against the belt and thereby compressing the belt between the secondary drums at said secondary station; and means mounted in the support having driving connection to one of the drums of each pair of drums.

8. In a dried fruit processing apparatus; a support;

substantially cylindrical primary and secondary members each having peripheries concentric to an axis of rotation therefor; means mounted in the support and connected to the primary and secondary members for cooling the peripheries thereof; means individually rotatably mounting said members in the support with their axes substantially horizontal and with the axis of the primary member above and in laterally spaced parallel relation to the secondary member, said members thereby having upwardly and downwardly and relatively inwardly and outwardly disposed peripheral portions, the downwardly disposed peripheral portion of the primary member and the upwardly disposed peripheral portion of the secondary member being substantially tangential to a common horizontal plane; powered means borne by the support and connected to the members for imparting rotation thereto in opposite direction so that their outwardly disposed peripheries move downwardly; an elongated endless flexible belt having an upper arcuate run continuously extended along and in engagement with the outwardly and downwardly disposed peripheral portions of the primary member, an intermediate run extended from the primary member to the secondary member substantially in said horizontal plane, a lower arcuate run extended around the upwardly, outwardly, and downwardly disposed peripheral portions of the secondary member, and a return run interconnecting said arcuate runs; means mounting the belt for longitudinal, frictionally driven, movement by the members; means mounted in the support for supplying fruit to be processed to the primary member in advance of said upper run; means mounted in the support in engagement with the primary member between the supply means and said upper run for engaging fruit prior to travel between the primary member and the belt; means mounted in the support engaging the lower arcuate run of the belt on the opposite side thereof from the primary member for engaging fruit on the belt; and means mounted in the support and connected to both of said fruit engaging means for applying heat thereto.

9. A method for segregating raisins and other dried fruit according to their degrees of stickiness, said raisins having sticky areas spaced about the surfaces thereof and having two opposed sides as alternative orientation surfaces, comprising the steps of conveying non-segregated raisins through spaced predetermined first and second raisin receiving stations, supporting the raisins on a cooled first reaction member and simultaneously pressing a heated first raisin adherent member against a first orientation surface of each of the raisins as the raisins are conveyed through said first station to cause raisins having their sticky surfaces facing such member to adhere to the member, and conveying the remaining raisins which do not adhere to the first member through said second station and pressing a heated second raisin adherent member against a second orientation surface opposite from said first orientation surface while pressing a cooled second reaction member against said first orientation surface of each of said remaining raisins as they pass through the second station to cause raisins having their sticky surfaces facing said heated second raisin adherent member to adhere thereto.

10. In an apparatus for segregating raisins according to their degrees of surface stickiness and wherein some of the raisins have peripherally spaced areas of different degrees of stickiness; a support; first conveying means mounted in the support for carrying non-segregated raisins in a predetermined forward direction through a first raisin receiving station; means engaging and cooling said conveying means; a first raisin adherent member mounted in the support in engagement with the conveying means at said first station, for contacting such raisins as they pass through said first station, and for picking out those raisins which adhere to such member; means engaging and heating said first member; second conveying means mounted in the support in engagement with said first conveying means in forwardly adjacent spaced relation to said adherent member with respect to the direction of movement of the first conveying means for conveying the raisins which do not adhere to said first member to a second raisin receiving station and for re-orientating such non-adherent raisins during travel from the first to the second station so that the raisins pass through the second station in a different attitude from that through said first station; second raisin adherent member being mounted in the support in engagement with the second conveying means, adjacent to the second station, for contacting raisins passing therethrough, and for picking out those raisins which adhere to said second adherent means; means engaging and cooling said second conveying means during its engagement with said second member and means engaging and heating said second member.

References Cited in the file of this patent

UNITED STATES PATENTS

| 581,908 | Gent | May 4, 1897 |
| 2,291,447 | Bierbrauer | July 28, 1942 |

FOREIGN PATENTS

| 412,755 | France | May 10, 1910 |